June 16, 1925. 1,542,803
C. GORDON ET AL
LATHE
Filed July 19, 1920 5 Sheets-Sheet 2
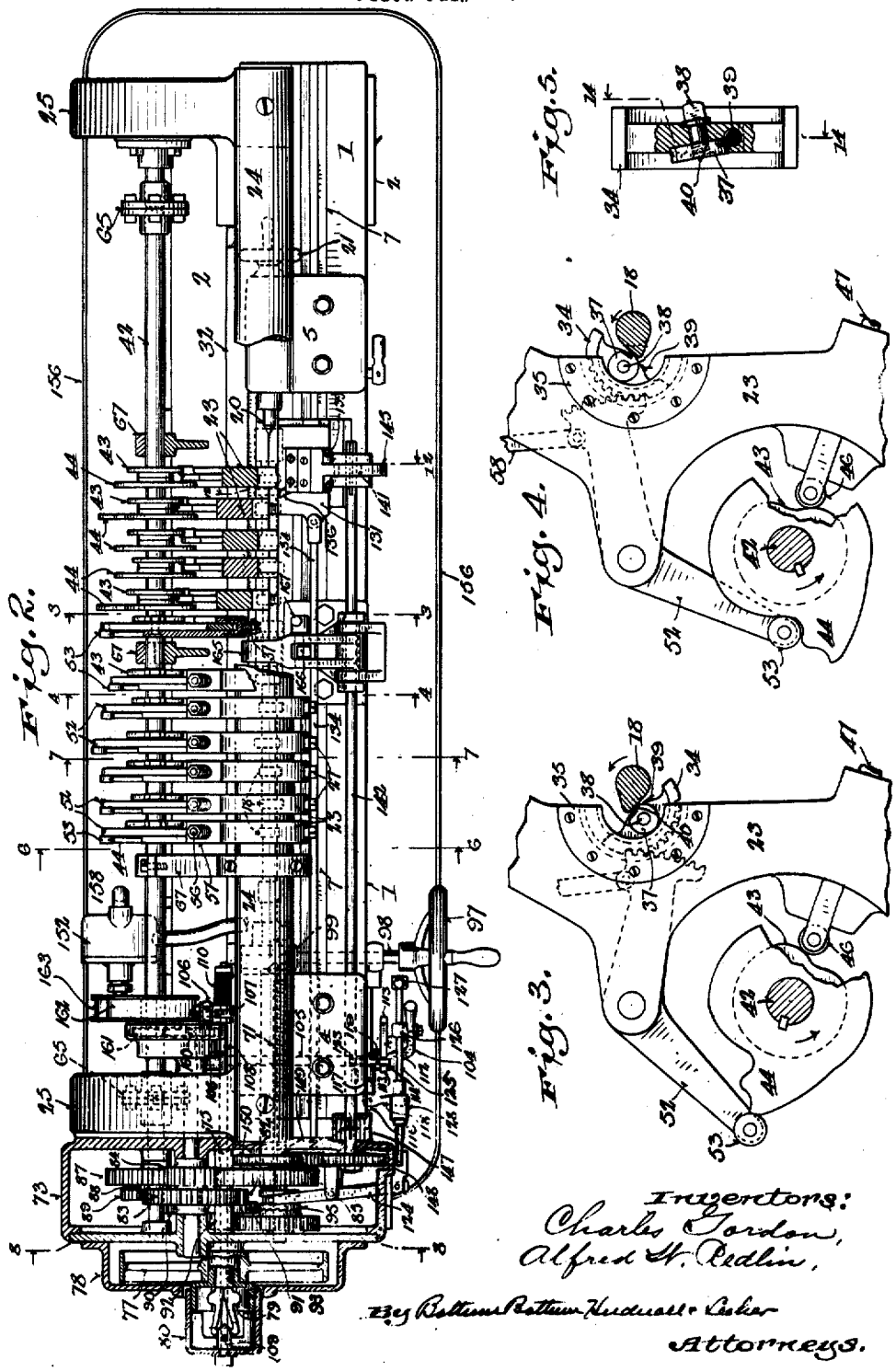

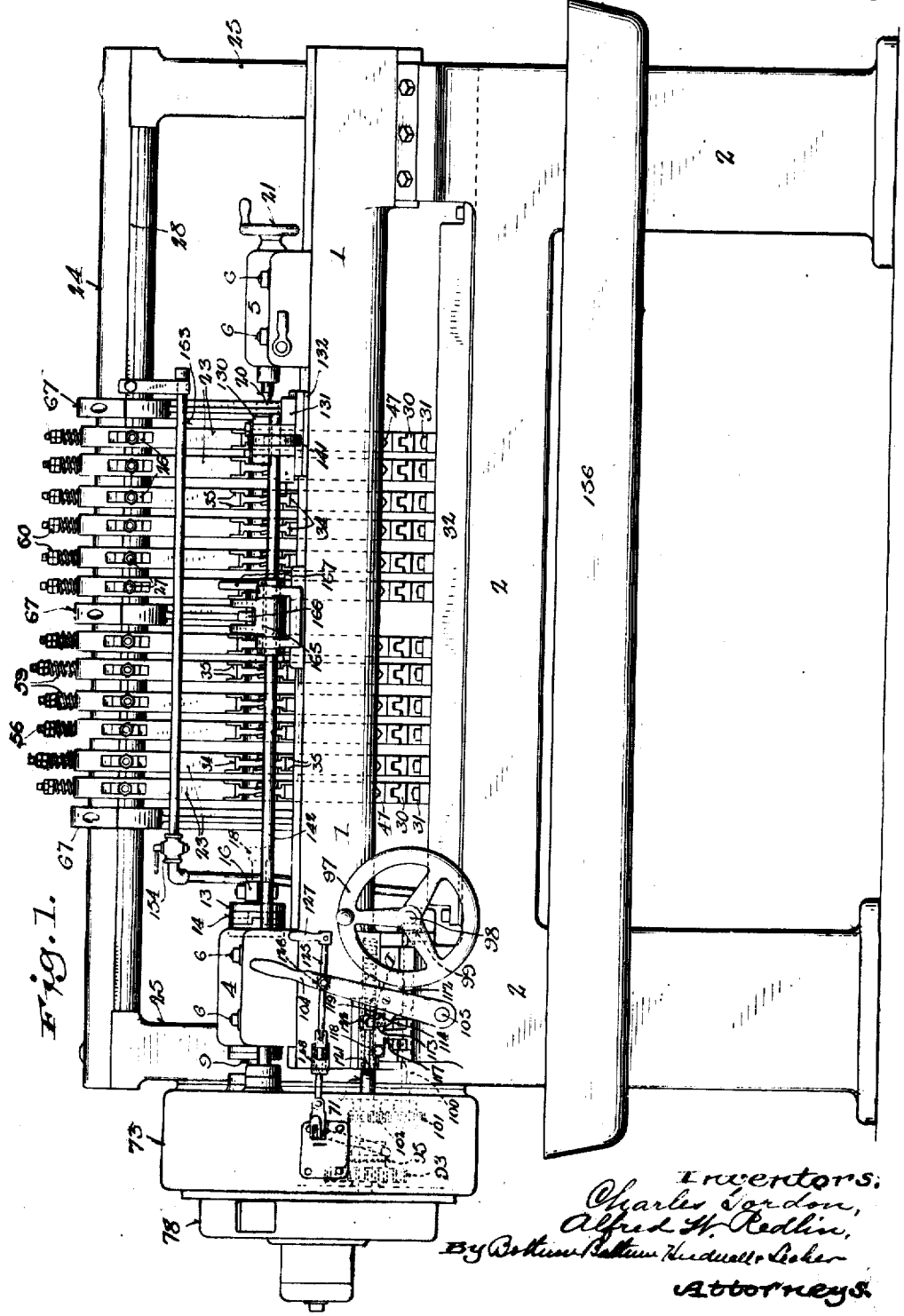

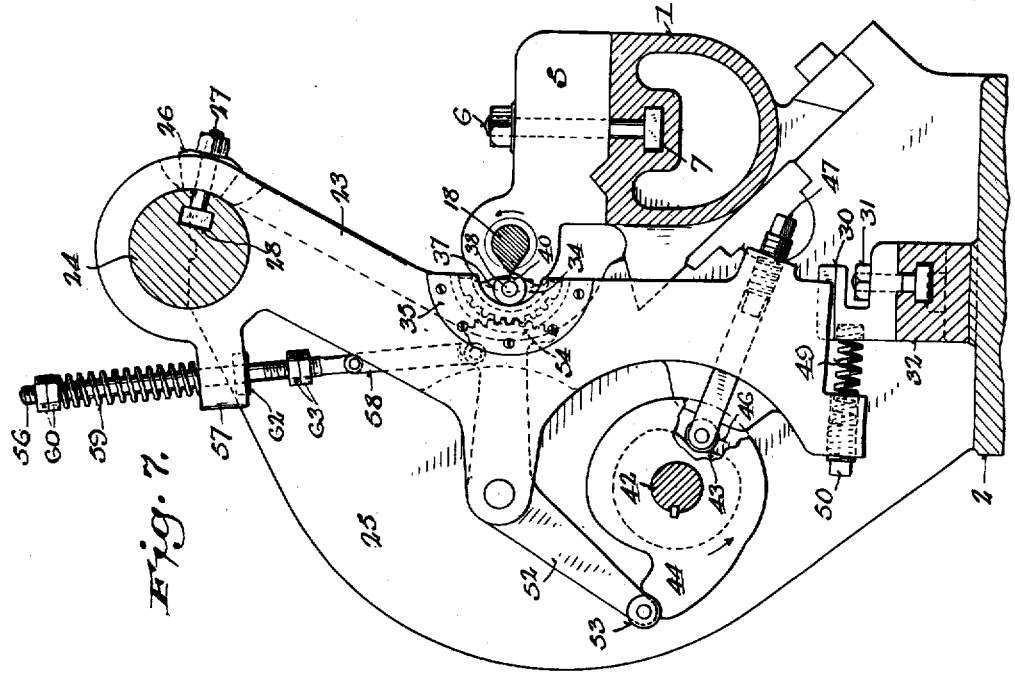
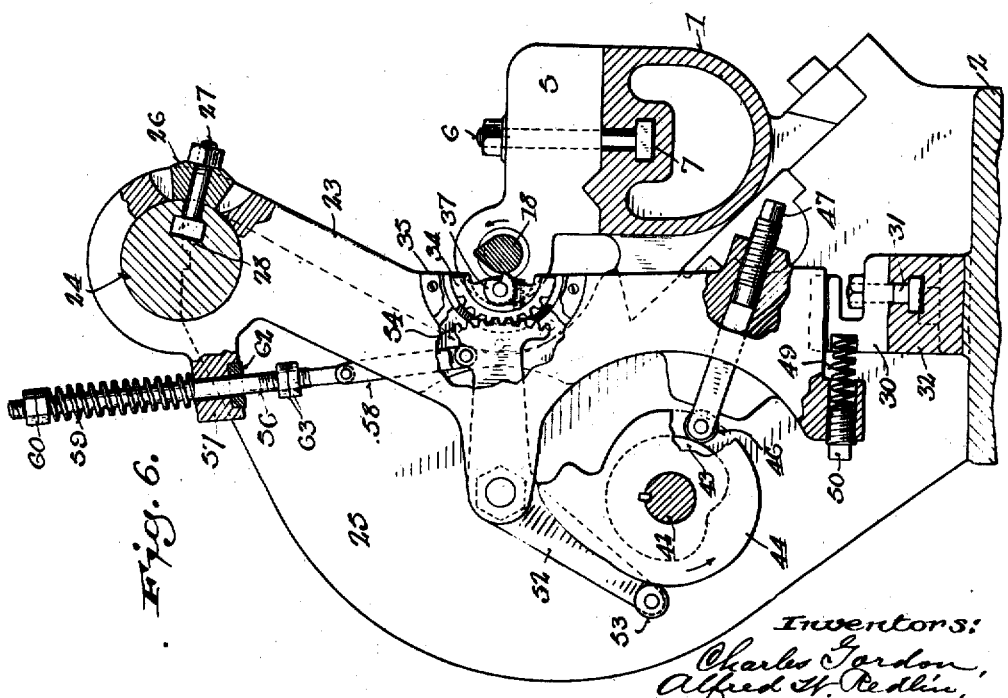

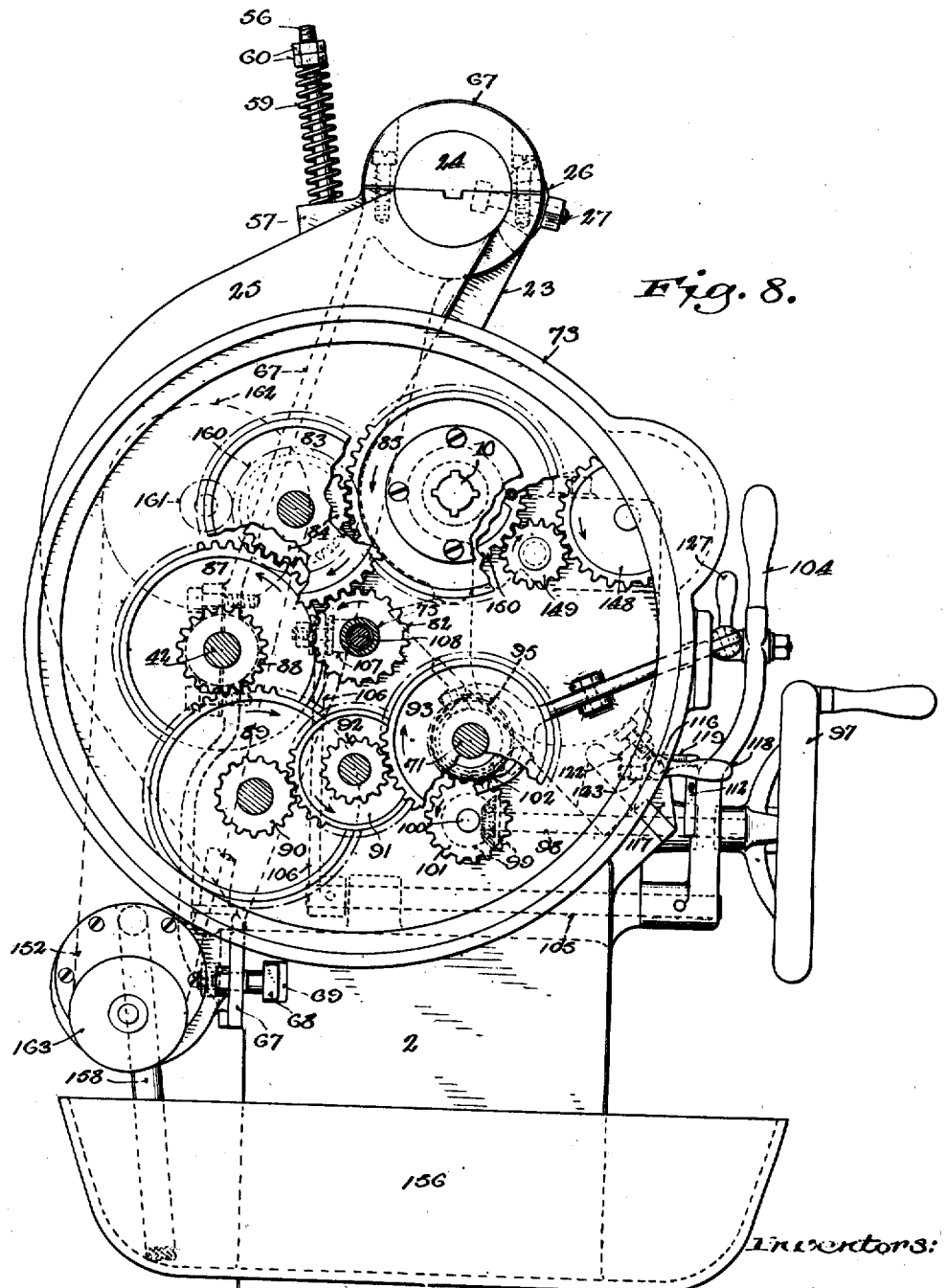

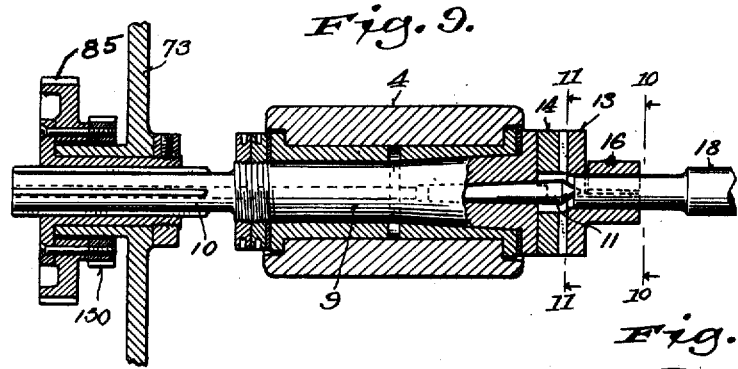
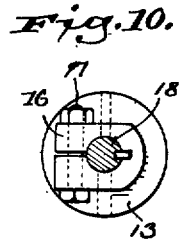
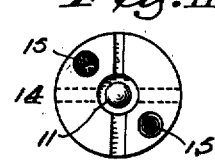
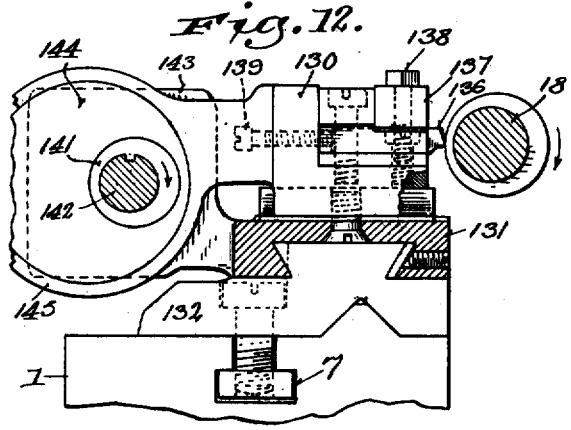
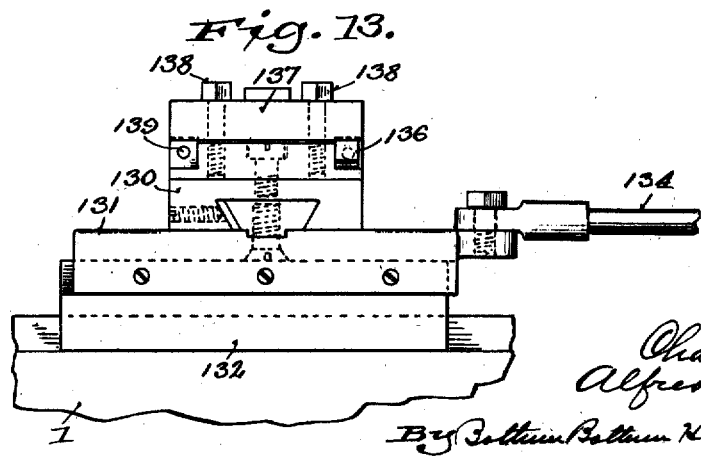

Patented June 16, 1925.

1,542,803

UNITED STATES PATENT OFFICE.

CHARLES GORDON, OF MILWAUKEE, WISCONSN, AND ALFRED W. REDLIN, OF SAGINAW, MICHIGAN, ASSIGNORS, BY MESNE ASSIGNMENTS, TO THE GORDON FORM LATHE COMPANY, OF CLEVELAND, OHIO, A CORPORATION OF OHIO.

LATHE.

Application filed July 19, 1920. Serial No. 397,239.

*To all whom it may concern:*

Be it known that we, CHARLES GORDON and ALFRED W. REDLIN, citizens of the United States, residing at Milwaukee, in the county of Milwaukee and State of Wisconsin, and at Saginaw, in the county of Saginaw and State of Michigan, respectively, have invented certain new and useful Improvements in Lathes, of which the following is a specification, reference being had to the accompanying drawing, forming a part thereof.

This invention relates more particularly to lathes for turning irregular or non-circular bodies such as cams, cheek pieces of cranks, etc.

Its main objects are to expedite and facilitate turning or shaping such bodies with accuracy; to maintain the cutting tool at the proper cutting and clearance angles to the work by varying the angle of the tool relative to its support and the work while the cutting is being done; and generally to adapt the construction and operation of a lathe to successfully perform this kind of work.

It consists in the construction, arrangement and combination of parts as hereinafter particularly described and pointed out in the claims.

In the accompanying drawing like characters designate the same parts in the several figures.

Figure 1 is a front elevation of a lathe embodying the invention and specially designed for rough-turning cams on the cam shafts of internal combustion engines; Fig. 2 is a plan view of the machine, parts of which are shown in horizontal section and other parts broken away; Fig. 3 is an enlarged vertical cross section on the line 3—3, Fig. 2, illustrating the operation of tool shifting and controlling cams and a cutting tool with relation to a cam shaft constituting the work; Fig. 4 is a similar section on the line 4—4, Fig. 2, showing a cutting tool in a different relation to the work and tool shifting and controlling cams in corresponding positions; Fig. 5 is an enlarged front elevation and section on the line 5—5, Fig. 14, of a tool holder and a cutting tool; Figs. 6 and 7 are enlarged vertical cross sections on the lines 6—6 and 7—7 respectively, Fig. 2, showing a cutting tool in different relations to the work and shifting and controlling cams in corresponding positions; Fig. 8 is an enlarged end elevation of the machine as viewed from the left relative to Figs. 1 and 2, showing the transmission gearing, the gear case cover being removed; Fig. 9 is an enlarged longitudinal section of the carriage head stock, rotary work holder, spindle and driving connection; Figs. 10 and 11 are detail views in the planes indicated by dotted lines 10—10 and 11—11 respectively, Fig. 9, of the separable parts of the rotary work holder and floating coupling for connecting it with the spindle; Fig. 12 is an enlarged sectional detail view on the line 12—12, Fig. 2, of an attachment for rough-turning eccentrics on engine cam shafts; Fig. 13 is a rear elevation of the attachment; and Fig. 14 is a side elevation and partial section on the line 14—14, Fig. 5 of a tool holder and tool.

The machine comprises a work supporting carriage 1, guided horizontally and movable longitudinally in suitable ways at the ends of a frame 2.

On the carriage 1, are mounted and adjustable lengthwise thereof, a head stock 4 and a tail stock 5, which are fastened in place thereon by bolts 6, engaging a longitudinal T-groove or undercut slot 7 in the carriage, as shown in Figs. 6 and 7.

A spindle 9, journaled as shown in Fig. 9, in the head stock 4 is provided at one end with a splined extension 10, which forms an axially sliding rotating connection with a driving member of transmission gearing as hereinafter explained. At the other end the spindle 9 is provided with a cone pointed center 11, and with a work holder having a floating or self-centering connection with the spindle. As shown in Figs. 9, 10 and 11, the work holder and floating coupling for connecting it with the spindle consists of two separable members 13 and 14, which are connected with each other and with the end of the spindle by radial tongues and grooves like or similar to those of an Oldham coupling. The member 14 is loosely fastened to the spindle by screws 15 threaded in the spindle and passing through enlarged countersunk holes in said member, as shown in Fig. 11. The member 13 is formed with a split collar 16, provided with a clamping bolt 17 for fastening it on and in driving relation to the end of a cam shaft 18. The radial tongues and grooves on opposite sides of the center of the adjoining faces of the members 13 and 14 are made of different widths, as shown in Fig. 11, so that they can only be assembled in driving engagement in a certain angular relation to each other.

The tail stock 5 is provided in axial alignment with the spindle 9 and its center 11, with a cone pointed center 20, axially adjustable in the usual manner, by means of a screw and a hand wheel or crank 21 for shifting it into and out of engagement with a cam shaft, the opposite end of which is held on the head center 11.

The adjustment of the tail stock 5 provides for cam shafts of different lengths, while the adjustment of the head stock provides for turning cams which are at different distances from the ends of their shafts which are clamped in the work holder next to the spindle 9, and cams which are so closely spaced that they can not all be turned at one setting on account of the wider spacing of the cutting tools, with the closest practicable adjustment of which they are capable, but require two settings, alternate cams being turned with each setting.

Rocker arms or tool carriers or supporting members 23 are pivotally suspended or mounted on a cylindrical bar 24, carried above and parallel with the axis of the spindle 9 by standards 25 on the ends of the frame 2. The rocker arms are separately adjustable lengthwise on the bar 24 and are held thereon in the proper spaced relation to one another by guide blocks 26, fitted in slots in the hubs of the arms and adjustably fastened to the bar by bolts 27 engaging a longitudinal T-groove or undercut slot 28 in the bar, as shown in Figs. 1, 6 and 7. At their lower ends the rocker arms 23 are forked or grooved transversely to the bar 24, and engage guide blocks 30, which are adjustably fastened by bolts 31 in a T-groove or undercut slot in a guide rail 32, secured on the bed of the frame 2 parallel with the bar 24, as shown in Fig. 1, 6 and 7.

As shown in Figs. 3, 4, 6 and 7, angularly adjustable or oscillatory tool holders 34 are rotatably mounted in recesses formed in the front sides of the arms 23 with their axes opposite and parallel with the extended axis of the spindle 9 and tool holder. These tool holders, which are formed with gear teeth and laterally projecting curved flanges concentric with their axes, are guided and held in place in the recesses in the arms 23 by correspondingly curved and flanged segmental cap rings 35, fastened to opposite sides of the arms.

The tool holders may be provided with cutting tools of any suitable form, having cutting edges disposed radially to and their points at the center of the axis of oscillation.

As shown in Figs. 3, 4, 5, 6, 7 and 14, circular or segmental tools 37, are fitted and adjustably held in corresponding recesses in the sides of the tool holders by bolts 38, passing through the tool holders at a slight inclination to their axes and centrally threaded in the tools. The tools are formed with angular notches or recesses in their peripheries to provide cutting edges which are disposed radially both to the axes of the tools themselves and of the tool holders, with the points at the centers of the tool holders. The tools are formed with peripheral helical teeth engaged by adjusting screws 39, swiveled in holes or sockets formed in the tool holders transversely to their axes. The slight inclination of the axes of the tools to the axes of the tool holders, as shown in Fig. 5, provides for the proper clearance of the tool below its radial cutting edge 40.

A shaft 42, rotatably mounted on the machine frame behind, below and parallel with the axis of the spindle 9 and work holder, is provided with tool operating or shifting cams 43 and tool tilting or adjusting cams 44. The rocker arms 23 are provided with cam rollers 46, adjustable by screws 47 transversely to the cam shaft, for varying the depth of the cut made by the tools. Springs 49, interposed between the guide blocks 30 and adjusting screws 50 in the lower ends of the rocker arms, swing said arms towards the cam shaft and hold the rollers 46 in engagement with the cams 43, as shown in Figs. 6 and 7.

Angular levers 52, pivoted to rearward extensions of the arms 23, are provided at one end with cam rollers 53, arranged to bear against the rear sides of the cams 44, opposite the cam shaft, and are forced or provided at the other ends with segment gears 54, meshing with the teeth of the tool holders 34.

Rods 56, guided in rearwardly projecting lugs 57 on the hubs at the upper ends of the arms 23, are connected at their lower ends by links 58 with the levers 52 between their pivots and the gears 54.

Springs 59 interposed between the lugs 57 and adjusting nuts 60 on the upper ends of the rods 56, tend to turn the gears 54 upwardly and the cutting edges of the tools 37 downwardly, and to hold the cam rollers 53 against the cams 44. The lugs 57 are provided on the under side with rubber cushions 62, and the rods 56 are provided below the cushions with nuts or adjustable stops 63, for limiting the movement of the levers 52 without shock or jar to the tool holders and tools when the rollers 53 pass over the high points of the cams 44.

The spacing of the cams 43 and 44 on the shaft 42 to correspond with the variable spacing of the cams to be turned, may be varied by individual adjustment of the cams on the shaft, or preferably by making the cam shaft 42 readily removable from the machine and permanently adjusting the cams thereon for any given job, so that for turning cams of different forms and spacing, other cam shafts 42, with tool operating or shifting cams 43, and tool tilting or adjusting cams 44 of the required shapes and spacing, may be substituted. For this purpose the cam shaft 42 is made in sections which are connected by flanged or other readily detachable couplings 65, as shown in Fig. 2, so that the section on which the cams are mounted may be easily removed from the machine without disturbing the adjustment of the cams.

The machine is preferably provided as shown in Figs. 1, 2 and 8, with one or more struts or braces 67, which are adjustable lengthwise of the machine and are mounted at their upper ends on the bar 24, and are connected at their lower ends with the bed of the frame 2 by bolts 68, engaging a longitudinal T-groove or undercut slot 69 in the rear side of the bed. These struts or braces are provided with bearings for supporting the cam shaft 42, and when they are used, the bearing for the cam shaft at the end of the frame opposite the driving end of the shaft, the adjacent end section of the shaft, and the coupling 65 therefor, may be dispensed with, so that the shaft or section thereof on which the cams are mounted may be more easily and quickly removed.

The carriage 1, is traversed to carry the work mounted thereon transversely along the points of the tools 37, by a feed screw 71, parallel with the spindle 9, as shown in Figs. 1 and 2.

Referring to Figs. 1, 2 and 8, the spindle 9 and work holder and the cam shaft 42 with the tool shifting and adjusting cams 43 and 44, are rotated synchronously, and the feed screw 71 for traversing the carriage 1 and moving the work past the points of the tools 37, is rotated by transmission gearing housed in a box or case 73, attached to one end of the frame 2.

The transmission gearing comprises a tubular shaft 75, extending through and projecting at its outer end from the gear case 73, parallel with the spindle 9, cam shaft 42 and feed screw 71. On the outer end of the shaft 75 a pulley or main driving member 77 is loosely mounted, and the driving pulley is enclosed in a housing 78, mounted and angularly adjustable on the cover of the gear case 73, so that the belt (not shown) for driving the pulley from a motor or countershaft located in different positions relative to the machine, may lead in different directions, according to the location of the motor or countershaft. The pulley 77 is operatively connected with the shaft 75 by a friction clutch 79, covered by a housing 80, which rotates with the pulley.

A gear 82, fixed on the shaft 75, is connected by a train of speed reducing gears 83, 84 and 85, with the spindle 9 and work holder, the hub of the gear 85 having a splined or axially sliding driving connection with the extension 10 of the spindle, as shown in Fig. 9.

The gear 84 is connected by a train of speed reducing gears 87, 88, 89, 90, 91, 92 and 93 with the feed screw 71, the gear 93 being loosely mounted on the feed screw and operatively connected therewith by a clutch 95.

The gears 87 and 88 are fixed on the driving section of the cam shaft 42.

The feed screw 71 is operated manually when the clutch 95 is disengaged to traverse the carriage 1 in either direction, by a hand wheel or crank 97, mounted on the front end of a transverse shaft 98, which is connected by bevel gears 99 with a shaft 100, below and parallel with the screw 71. The shaft 100 is connected by spur gears 101 and 102 in the gear case 73, with the screw 71.

The clutch 79 is shifted to connect and disconnect the spindle 9 and work holder, cam shaft 42 and feed screw 71, with the pulley 77 by means of a lever 104, fixed on the front end of a transverse shaft 105. The shaft 105 is provided at its rear end with an upwardly extending arm 106, which is connected by an adjustable pivot coupling 107 with a rod 108 passing through the tubular shaft 75 and connected at its outer end with a jaw expander 109 of the clutch 79, as shown in Fig. 2. A spring 110 interposed between the pivot coupling 107 and an abutment on the machine frame, as shown in Fig. 2, tends to shift and hold the jaw expander 109 in releasing position.

The lever 104 is provided on the rear side with a segment 112 formed at the ends with stop lugs 113 for limiting the throw of the lever, and next to one of the lugs with a notch 114.

A short rocker shaft 116, is mounted in a bracket 117 on the frame 2 parallel with the feed screw 71 and adjacent the segment 112. At one end the rocker shaft 116 is provided with a forwardly projecting handle 118, and at the other end with a forwardly projecting finger 119, adapted by engagement with the notch 114 in the segment to hold the lever 104 in clutch-engaging position.

In a T-groove or undercut slot 121 formed in the carriage 1 adjacent and parallel with the rocker shaft 116, a trip dog 122 is adjustably bolted and is adapted by engagement with a rearwardly extending arm 123, on the rocker shaft, as shown by dotted lines in Fig. 8, to turn the finger 119 upwardly out of engagement with the notch 114, and thereby release the lever 104 and permit the spring 110 to disengage the clutch 79, when the carriage 1 reaches a certain point in its advance movement, according to the adjustment of the dog.

The clutch 95 is operated by a shifting lever 124 with the outer end of which a rod 125 is pivotally connected, as shown in Fig. 2. The rod 125 passes loosely through a block 126 pivoted on the rear side of the lever 104, and is provided at the end adjacent said lever with a handle 127. The block 126 is adapted by engagement with a spring cushion 128, shown in Figs. 1 and 2 on the rod 125, to disengage the clutch 95 when the lever 104 is released and thrown by the spring 110 into position to disengage the clutch 79.

Referring to Figs. 1, 2, 12 and 13, for turning eccentrics on cam shafts simultaneously with the cams, the machine is provided with a tool supporting slide or holder 130, mounted and movable transversely to the travel of the carriage 1 on a saddle 131, which in turn is slidably mounted and guided lengthwise of the carriage on a base or supporting block 132. The base 132 is guided on and adjustable lengthwise of the carriage 1, to which it is secured in adjusted position by bolts engaging the T-grooves 7 in the carriage. A tie rod 134, arranged parallel with the carriage ways, connects the saddle 131 with the gear case 73 or a fixed part of the machine, and holds the saddle in a stationary position relative to the carriage. For adjusting the position of the eccentric turning attachment on the carriage according to the varying location of eccentrics on cam shafts to be turned, tie rods 134 of different lengths are provided.

The attachment is provided with a cutting tool 136, which is adjustably clamped in the slide or holder 130 by a bar 137 and bolts 138, and is adjusted lengthwise therein transversely to the travel of the carriage by a screw 139. The tool holder as shown, is designed for clamping a tool in either end thereof, and is provided with two adjusting screws 139.

The tool slide or holder with the tool, is moved transversely to the work or travel of the carriage by an actuating eccentric 141, loosely splined on a shaft 142, parallel with the axis of the spindle 9 and work holder, and confined with a compensating eccentric 144 between cheek pieces 143 on the saddle. The eccentric 144 mounted on the eccentric 141, works in a strap 145 on the tool holder and causes the tool 136 to turn an eccentric on a cam shaft 18 corresponding exactly with the eccentric 141.

The shaft 142 is connected as shown in Fig. 2, by an angularly adjustable coupling 147, with a driving gear 148, in the gear case 73, for varying the angular adjustment of the actuating eccentric 141 relative to the spindle 9 and work holder and the cam shaft 42.

As shown in Figs. 2 and 8, the gear 148 is connected by an idle gear 149, with a gear 150, fixed to the hub of the spindle driving gear 85, so as to rotate the shaft 142 with the eccentric 141 synchronously with the spindle 9 and work holder and the cam shaft 42.

As shown in Figs. 1, 2 and 8, the machine is provided on the rear side with a pump 152 for supplying oil or cutter liquid to the cam and eccentric turning tools through a perforated pipe 153, arranged lengthwise of the machine above the tools and provided with a controlling and regulating valve 154.

The frame 2 is formed or provided below the carriage and cutting tools with a trough or receptacle 156 for catching and holding the oil or cutter fluid supplied to the tools. The oil or cutter fluid is drawn from this trough or receptacle by the pump through a pipe 158.

The pump is driven from an extension of the shaft of the gears 83 and 84 by gears 160 and 161 indicated by dotted lines in Figs. 2 and 8, and by a pulley 162 on the shaft of the gear 161 belted to a pulley 163 on the pump shaft.

The operation of the eccentric shaft 134 and of the pump are manually and automatically controlled, like the operation of the spindle 9 and cam shaft 42, by the lever 104 and trip dog 122.

For turning cam shafts having center bearings, the machine is provided with a steady rest 165, adjustably mounted on and movable with the carriage 1, as shown in Figs. 1 and 2. This rest comprises two jaws or members, which are hinged together so that the upper jaw or member can be turned up and back out of the way, for placing the work on the carriage and removing it therefrom. The upper movable member is locked and held in operative position on the work by a dog 166, pivotally mounted in the lower member and operated by a handle 167 for engaging and disengaging it with a cross pin in the upper member. The eccentric shaft 142 passes through and is guided in a tubular bolt or pin which pivotally connects the members of the rest.

In the operation of the machine for rough turning cam shafts having pump eccentrics, the rocker arms 23 having been adjusted on the bar 24 and the guide blocks on the rail 32 to correspond with the spacing of the cams on the shafts to be turned, and tool shifting and adjusting cams 43 and 44 of the required shapes having been properly adjusted on the cam shaft 42, or a shaft on which such cams have been previously assembled as required for the work to be done, having been placed in the machine and connected with the transmission gearing in proper angular relation thereto, the collar 16 of the work holder is clamped on one of the end journals or bearings of a cam shaft to be turned, and the cam shaft is then placed in the machine on the centers 11 and 20, for which center seats have been accurately formed in the ends of the cam shaft.

The eccentric turning attachment being adjusted in proper position with relation to the work on the carriage 1, and connected by a tie rod 134 of the reqired length with the gear case 73, and the coupling 147 being adjusted to turn the pump eccentric in the proper angular relation to the cams to be simultaneously turned on the same shaft, the operator throws the lever 104 to the right, as shown in Figs. 1 and 2, thereby engaging the clutch 79, and operatively connecting the spindle 9 and the tool controlling cam shaft 42 with the driving pulley 77. The finger 119 dropping into the notch 114 of the segment 112, locks and holds the clutch 79 in engagement against the tension of the spring 110.

The trip dog 122 having been adjusted in the groove 121 to stop the machine when the cutting tools have all cleared the cams and eccentric on the work shaft mounted on the carriage 1, and the carriage having been run back to its starting position at the left by the hand wheel or crank 97, the handle 127 is shifted to the right by the operator, thereby engaging the clutch 95 and operatively connecting the feed screw 71 with the gear 93.

As the work is fed with the carriage past the points of the cutting tools 37 and 136 and is rotated with the spindle 9 and work holder, the cams and eccentric on the work shaft are simultaneously turned to the required shapes and in the proper angular relation to one another, determined by the shapes and adjustment of the tool shifting cams 43, and the adjustment of the eccentric turning tool 136 and its actuating eccentric 141.

The cam turning tools 37 are automatically tilted or angularly adjusted and maintained at the proper cutting and clearance angles to the several parts of the work, as illustrated in Figs. 3, 4, 6 and 7, by the cams 44.

When the several parts of the work have all cleared the tools which have operated thereon, the trip dog 122 by engagement with the arm 123, lifts the finger 119 out of the notch 114 in the segment 112, thereby releasing the lever 104, which is then thrown by the spring 110 to the left, the clutch 79 being simultaneously disengaged and the the pulley 77 or main driving member of the machine being disconnected from the transmission gearing through which the several operative parts of the machine are actuated.

When the lever 104 is thus thrown to the left by the spring 110, the block 126 by engagement with the cushion 128 shifts the lever 124 and disengages the clutch 95, thereby disconnecting the feed screw 71 from the transmission gear 93, so that the table 1 can be manually returned to its starting position by the hand wheel or crank 97.

Any eccentricity or inaccuracy in the journal or bearing of the cam shaft 18 which is clamped in the work holder 13, is compensated for by the floating connection of the work holder with the spindle 9, the true position of the work in the machine being determined by the head and tail centers 11 and 20.

When the cams or parts of the work are so closely spaced that they cannot all be turned at once on account of the limit to the close spacing of the rocker arms 23 and the tool operating and controlling cams 43 and 44, due to structural considerations, the rocker arms are adjusted on the bar 24 and the cams on the shaft 42, to turn alternate cams or parts of the work, which then requires two settings or adjustments of the head and tail stocks 4 and 5 and of the trip dog 122.

One or more of the rocker arms and corresponding tool operating and controlling cams may be used, according to the work to be performed.

For turning single non-circular or irregular pieces such as the cheek pieces of crank shafts, the spindle 9 is to be provided with a work holder and driving connection of the proper construction, according to the shape of the work, and the tail stock 5, eccentric turning attachment, with its base block 132, steady rest 165, and more or less of the rocker arms 23 may be removed from the machine or left thereon, if they are not in the way.

Various changes in the construction and arrangement of parts of the machine to adapt it for turning work of different kinds having more or less parts of various shapes and arrangements, may be made without departure from the principle and scope of the invention, as defined in the following claims.

We claim:

1. In a lathe the combination of a work holder, a tool carrier movable transversely to the axial line of the work holder, a tool mounted and angularly movable on the carrier, automatic means for moving the carrier towards and from the work, and means for varying the angular relation of the tool to the carrier and work to maintain proper cutting and clearance angles of the tool to work of non-circular contour synchronously with the rotation of the work.

2. In a lathe the combination of a rotary work holder, a tool holder provided with a cutting tool, movable towards and from the axial line of the work holder and angularly adjustable in a plane transverse to the axis of the work holder, cams adapted to vary the distance between the point of the tool and the axial line of the work holder and to vary the adjustment of the tool for maintaining proper cutting and clearance angles of the tool to work of non-circular contour, means for synchronously rotating the work holder and cams, and means for simultaneously causing relative movement between the work holder and tool holder axially with relation to the work holder.

3. In a lathe the combination of a rotary tool holder, means for rotating the same, an angularly adjustable tool holder movable transversely to the axis of the work holder, a tool carried by the tool holder with its cutting edge radial to and its point at the center of its angular adjusting movement, and cams rotated synchronously with the work holder, one adapted to shift the tool holder and tool transversely to the axis of the work holder and the other to vary the angular adjustment of the tool holder and tool relative to the work.

4. In a lathe the combination of a rotary work holder, means for rotating said holder, a tool supporting member movable transversely to the axis of the work holder, a tool holder carried by said supporting member opposite the axis of the work holder and oscillatory about an axis parallel with the axis of the work holder, a tool mounted in the tool holder with its point at the center of oscillation of the tool holder, and tool shifting and adjusting cams rotated synchronously with the work holder, one adapted to shift the tool supporting member transversely to the axis of the work holder and the other to oscillate the tool holder with the tool while the tool is working.

5. In a lathe the combination of a rotary work holder, means for rotating said holder, a tool supporting member movable transversely to the axis of the work holder, a segmental, toothed tool holder carried by said supporting member opposite the axis of the work holder and oscillatory about an axis parallel with the axis of the work holder, a tool mounted in the tool holder with its point at the center of oscillation, a segmentally toothed arm pivotally mounted on the tool supporting member in mesh with the tool holder, and tool shifting and adjusting cams rotated synchronously with the work holder, one adapted to shift said supporting member with the tool holder and tool transversely to the axis of the work holder and the other to oscillate the toothed arm and tool holder with the tool relative to the supporting member.

6. In a lathe the combination of a rotary work holder, means for rotating said holder, a rocker arm mounted to swing transversely to the axis of the work holder on an axis parallel therewith, a tool holder carried by said rocker arm and oscillatory on an axis opposite and parallel with the axis of the work holder, a tool mounted in the tool holder with its point at the center of oscillation, a tool shifting cam adapted to swing said rocker arm with the tool holder and tool transversely to the axis of the work holder, a tool adjusting cam adapted to oscillate the tool holder and tool relative to the rocker arm, and means for rotating the cams synchronously with the work holder.

7. In a lathe the combination of a rotary work holder, means for rotating said holder, a tool supporting member movable transversely to the axis of the work holder, a tool holder carried by said supporting member and oscillatory about an axis opposite and parallel with the axis of the work holder, a tool mounted in the tool holder with its point at the center of oscillation, a cam adapted to shift the tool supporting member towards the work holder, means for adjusting the movement of said supporting member by the cam to vary the depth of cut by the tool, a cam adapted to oscillate the tool holder and tool to maintain the proper angle of the tool relative to the work, and means for rotating the cams synchronously with the work holder.

8. In a lathe the combination of a rotary work holder, a rocker arm pivotally mounted on an axis parallel with the axis of the work holder and provided with an adjustable cam roller, a segmental toothed tool holder carried by the rocker arm and oscillatory on an axis parallel with and opposite the axis of the work holder, a tool carried by the tool holder with its point at the center of oscillation, a tool tilting lever pivoted on the rocker arm and provided with a cam roller and with a toothed segment meshing with the tool holder, a shaft parallel with the axis of the work holder and provided with cams engaging the cam rollers, springs acting on the rocker arm and tool tilting lever and holding the cam rollers in engagement with the cams, and means for rotating the work holder and cams synchronously.

9. In a lathe the combination of a rotary work holder, a rocker arm mounted at one end on a fixed axis parallel with the axis of the work holder, a stationary guide engaging said arm at its other end, an oscillatory tool holder mounted on the rocker arm with its axis opposite and parallel with the axis of the work holder and provided with a cutting tool having its point at the center of oscillation, a cam adapted to move the rocker arm transversely to the work, a cam adapted to oscillate the tool holder and maintain the tool at the proper angle to the work, and means for rotating the work holder and cams synchronously.

10. In a lathe the combination of an oscillatory tool holder, an angularly adjustable segmental toothed cutting tool pivotally mounted in the tool holder with its periphery intersecting the axis of oscillation of the tool holder, and an adjusting screw swiveled in the tool holder transversely to the tool pivot and engaging the teeth of the tool.

11. In a lathe the combination of an oscillatory tool holder, and a segmental tool angularly adjustable in said holder on an axis inclined to the axis of the holder, and having a radial cutting edge terminating with its periphery at the center of oscillation of the holder.

12. In a lathe the combination of a frame, a work carriage guided thereon, means for feeding the carriage, a head stock mounted on the carriage, a rotary spindle journaled in the head stock and provided at one end with a centering work holder and at the other with a driving connection, a tail stock adjustable on the carriage towards and from the head stock and provided with an axially adjustable center in axial alignment with the spindle, tool supporting members movable transversely to the carriage, oscillatory tool holders mounted on said supporting members and provided with cutting tools, work shaping and tool adjusting cams, and means for rotating the work holder and cams synchronously.

13. In a lathe the combination of a frame, a carriage mounted thereon and provided with a rotary work holder, means for feeding the carriage, a bar mounted on the frame, rocker arms pivotally mounted on said bar, cutting tools carried by said arms and movable therewith transversely to the path of the carriage, cams adapted to shift the arms with the tools relative to the work for producing the desired shapes of parts on which the tools operate, and means for rotating the work holder and cams synchronously.

14. In a lathe the combination of a frame, a carriage mounted thereon and provided with a rotary work holder, means for feeding the carriage, a stationary bar mounted on the frame, rocker arms pivotally mounted on said bar and movable transversely to the carriage travel, oscillatory tool holders carried by said arms and provided with cutting tools having their points at the center of oscillation of the tool holders, levers pivoted on the rocker arms and geared with the tool holders, a shaft provided with tool shifting and tilting cams adapted to actuate said rocker arms and levers, and means for rotating the work holder and cam shaft synchronously.

15. In a lathe the combination of a frame, a carriage guided thereon and provided with a rotary work holder, means for feeding the carriage, rocker arms pivotally mounted on an axis parallel with the carriage travel and separately adjustable lengthwise of said axis, angularly adjustable cutting tools carried by the rocker arms, a shaft parallel with the pivot axis of the rocker arms and provided with tool shifting and tilting cams adjustable lengthwise thereof, and means for rotating the tool holder and cam shaft synchronously.

16. In a lathe the combination of a frame, a carriage guided thereon and provided with a rotary work holder, means for feeding the carriage, rocker arms pivotally mounted on the frame and provided with cutting tools movable therewith transversely to the travel of the carriage, cams for swinging the rocker arms, a shaft on which the cams are assembled removably mounted on the frame, and transmission gearing adapted to rotate the work holder and cam shaft synchronously and having a driving member with which the cam shaft is coaxially and detachably connected.

17. In a lathe the combination of a frame, a carriage guided on the frame and provided with a rotary work holder, means for feeding the carriage, tool supports movable transversely to the carriage travel, angularly movable tools carried by said supports, cams for shifting said supports with the tools relative to the work, cams for varying the angular relation of the tools to said supports, a saddle slidably mounted and guided on the carriage lengthwise thereof, a tool holder guided and movable on the saddle transversely to the carriage travel, an eccentric mounted on said saddle and connected with the tool holder, means for holding said saddle in a fixed position relative to the carriage, and transmission gearing adapted to rotate the work holder, cams and eccentric synchronously.

18. In a lathe the combination of a frame, a carriage guided on the frame and provided with a rotary work holder, means for feeding the carriage, a cylindrical bar mounted on the frame parallel with the carriage travel and formed with an undercut longitudinal groove, rocker arms pivotally mounted on said bar, guide blocks engaging said arms and adjustably fastened by bolts in the groove of the bar, a guide rail fixed on the frame parallel with said bar and formed with an undercut longitudinal groove, guides engaging the rocker arms and adjustably fastened by bolts in the groove of the guide rail, cutting tools adjustably mounted on the rocker arms and movable therewith transversely to the path of the carriage, cams arranged to actuate the rocker arms and shift the tools transversely to the travel of the carriage, and means for rotating the work holder and cams synchronously.

19. In a lathe the combination of a frame, a carriage mounted thereon and provided with a rotary work holder, a rotary screw parallel with the axis of the work holder for feeding the carriage, tool supporting members movable transversely to the travel of the carriage and provided with cutting tools, a shaft provided with cams for shifting the tool supporting members and tools transversely to the carriage travel, transmission gearing adapted to rotate the work holder and cam shaft synchronously, and comprising a screw actuating member, and a clutch for operatively connecting said member with the transmission gearing.

20. In a lathe the combination of a frame, a carriage mounted thereon and provided with a rotary work holder, tool supporting members movable transversely to the travel of the carriage and provided with cutting tools, cams for actuating said tool supporting members, a tool base slidably mounted on the carriage lengthwise thereof, a transversely movable tool slide and holder mounted on said base, an eccentric mounted on said base and connected with the tool slide and holder, and transmission gearing adapted to rotate the work holder and cams synchronously, and comprising a driving member for said eccentric, and a shaft connecting the eccentric with the transmission gearing parallel with the carriage travel and having an angularly adjustable connection with its driving member.

21. In a lathe the combination of a frame, a carriage mounted thereon and provided with a rotary spindle and work holder, a screw for feeding the carriage, tool supporting members movable transversely to the carriage travel and provided with cutting tools, a cam shaft arranged parallel with the carriage travel and provided with cams for operating the tool supporting members, transmission gearing adapted to rotate the work holder and cams synchronously and comprising driving members for the work holder, feed screw and cams, the driving member for the work holder having an axially sliding connection with the spindle, and a clutch for connecting and disconnecting the feed screw and its driving member.

22. In a lathe the combination of a carriage provided with a rotary work holder, supporting members movable transversely to the travel of the carriage and provided with cutting tools, cams for actuating the tool supporting members, transmission gearing comprising a main driving member and adapted to rotate the work holder and cams synchronously and to feed the carriage, means for manually traversing the carriage in either direction, means for controlling the operation of the work holder and cams, and manually operated means for connecting the carriage with the transmission gearing independently of the work holder and cams.

23. In a lathe the combination of a carriage provided with a rotary work holder, supporting members movable transversely to the travel of the carriage and provided with cutting tools, tool shifting cams adapted to actuate said supporting members, means for rotating the work holder and cams synchronously, carriage feeding mechanism, and automatic means for stopping the carriage at a predetermined point in its traverse.

24. In a lathe the combination of a carriage provided with a rotary work holder, supporting members movable transversely to the travel of the carriage and provided with cutting tools, tool shifting cams adapted to actuate said supporting members, means for rotating the work holder and cams synchronously, carriage feeding mechanism, and adjustable means adapted to automatically stop the feed of the carriage at different points in its traverse.

25. In a lathe the combination of a carriage provided with a rotary work holder, supporting members movable transversely to the travel of the carriage and provided with cutting tools, tool shifting cams adapted to actuate said supporting members, means for rotating the work holder and cams synchronously, a screw for feeding the carriage, a screw driving member, a clutch for operatively connecting the screw and its driving member, means tending to disengage the clutch, means for locking the clutch in engagement, and a trip on the carriage adapted to disengage the locking means and release the clutch at a certain point in the traverse of the carriage.

26. In a lathe the combination of a carriage provided with a rotary work holder, supporting members movable transversely to the travel of the carriage and provided with cutting tools, cams for actuating the tool supporting members and shifting the tools relative to the work, means for rotating the work holder and cams synchronously, a rotary driving member, a feed screw for transversing the carriage, a clutch for connecting the feed screw with said driving member, and a clutch controlling trip adjustable on the carriage in the direction of its travel and adapted to automatically stop the feed screw at a variable point in the traverse of the carriage.

27. In a lathe the combination of a carriage provided with a rotary work holder, supporting members movable transversely to the travel of the carriage and provided with cutting tools, cams adapted to actuate the tool supporting members and to shift the tools relative to work on the carriage, a feed screw for traversing the carriage, transmission gearing comprising a main and auxiliary driving members for the work holder, cams and feed screw, a clutch controlling the connection of the auxiliary driving members with the main driving member, a second clutch controlling the connection of the feed screw with one of the auxiliary driving members, means for manually engaging the clutches separately, and a clutch controlling trip adapted to release both clutches at a predetermined point in the traverse of the carriage.

28. In a lathe the combination of a rotary work holder, a tool supporting member movable transversely to the axis of the work holder, a tool holder mounted and angularly adjustable on said member, work-shaping and tool-adjusting cams cooperating with the tool supporting member and tool holder to vary the distance between the tool and the axis of the work holder and to maintain the proper angular relation of the tool to the work, and means for rotating the work holder and cams synchronously.

29. In a structure of the class described, the combination of a tool support, a tool mounted on said support for swinging movement, a pattern cam corresponding to the shape of the cam to be cut for controlling said support, and means for swinging said tool whereby its cutting position relative to the work is maintained as the work revolves.

30. In a structure of the class described, the combination of a tool support, a tool mounted on said support for swinging movement, a pattern cam for the cam to be cut, said pattern cam being adapted to control said support, and means for swinging said tool in such wise as to maintain the same in proper cutting position relative to the work as the latter revolves.

31. In a machine of the character described, the combination of a tool support, a tool mounted on said support for angular movement relatively thereto, and means for moving said support and said tool in such wise as to cause the latter to produce a body of irregular form.

32. In a machine of the character described, the combination of a tool support, a tool mounted on said support for angular movement relatively thereto, and cams for moving said support and said tool in such wise as to cause the latter to produce a body of non-circular form.

33. In a machine of the character described, the combination of a work holder, a tool support movable transversely to the axis of the work holder, a tool holder mounted on said support for angular movement relatively thereto, a tool carried by said holder, means for moving said support and said tool holder in such wise as to cause said tool to produce a body of irregular form, and means for actuating said first-mentioned means in synchronism with the rotary movements of the work holder.

34. In a machine of the character described, the combination of a rotary work holder, a tool support movable transversely to the axis of the work holder, a tool holder mounted on said support for angular movement relatively thereto, a tool carried by said holder, cams for moving said support and said tool holder in such wise as to cause said tool to produce a body of non-circular form, and means for actuating said cams in synchronism with the rotary movements of the work holder.

35. In a lathe, the combination of a movable tool support, a total tiltably mounted on said support, and cams for moving said support and tool respectively for causing the latter to delineate a predetermined contour of non-circular form.

36. In a lathe, the combination of a movable tool support, a tool tiltably mounted on said support, and means for moving said support and tool respectively for causing the latter to delineate a predetermined contour of irregular form.

37. In a machine of the character described, the combination of a movable tool support, a tool mounted on said support for movement relatively thereto, a cam for controlling said support, and means for moving said tool angularly so as to prevent the same from assuming a non-cutting position relative to the work as the latter revolves.

38. The method of cutting an irregular form, consisting in bodily shifting a single point cutting tool toward and from the work and angularly tilting said tool relatively to its bodily shifting movement to retain the effective cutting position of the tool relative to the work during the cutting of the irregular form.

39. In a lathe, the combination of a work holder, a tool support movable in a plane transverse to the axis of the work holder, a spring urging said support in one direction, a cam acting to move said support in the opposite direction against the action of said spring, a tool holder pivotally mounted on said tool support, and a control cam for said tool holder adapted to swing the tool in synchronism with the movement of the support and the rotation of the work.

40. In a lathe, the combination of a rotary work holder, a supporting member movable transversely to the axis of the work holder, a spring acting on said supporting member to urge the same in one direction, a cam controlling the movement of said supporting member against the action of said spring, a tool holder mounted on said supporting member for swinging adjustment with respect thereto, an actuating cam therefor, and means for synchronously rotating said work holder and cams.

41. In a cam turning machine, a tool support, a single point cutting tool mounted on said support, means to move said tool toward and from the cam blank and to tilt the same to keep the cutting edge at an effective angle relative to the work to cut an irregular outline on the cam blank.

42. The combination of work holding means, a single point cutting tool, a support therefor automatically movable toward and from the axis of the holding means, means for moving said support and means for tilting said tool on said support.

In witness whereof we hereto affix our signatures.

CHARLES GORDON.
ALFRED W. REDLIN.

able transversely to the axis of the work holder, a spring acting on said supporting member to urge the same in one direction, a cam controlling the movement of said supporting member against the action of said spring, a tool holder mounted on said supporting member for swinging adjustment with respect thereto, an actuating cam therefor, and means for synchronously rotating said work holder and cams.

41. In a cam turning machine, a tool support, a single point cutting tool mounted on said support, means to move said tool toward and from the cam blank and to tilt the same to keep the cutting edge at an effective angle relative to the work to cut an irregular outline on the cam blank.

42. The combination of work holding means, a single point cutting tool, a support therefor automatically movable toward and from the axis of the holding means, means for moving said support and means for tilting said tool on said support.

In witness whereof we hereto affix our signatures.

CHARLES GORDON.
ALFRED W. REDLIN.

DISCLAIMER 1,542,803.—*Charles Gordon,* Milwaukee, Wis., and *Alfred W. Redlin,* Saginaw, Mich. LATHE. Patent dated June 16, 1925. Disclaimer filed February 24, 1930, by the patentees and the assignee by mesne assignments, *The Gordon Form Lathe Company.*

Hereby enter this disclaimer and disclaim from the scope of claims 23 and 24 of said patent all lathes and other machine tools, except those employing single-point cutting tools for the turning of irregular or non-geometric forms out of metal.

[*Official Gazette March 25, 1930.*]

DISCLAIMER 1,542,803.—*Charles Gordon,* Milwaukee, Wis., and *Alfred W. Redlin,* Saginaw, Mich. LATHE. Patent dated June 16, 1925. Disclaimer filed February 24, 1930, by the patentees and the assignee by mesne assignments, *The Gordon Form Lathe Company.*

Hereby enter this disclaimer and disclaim from the scope of claims 23 and 24 of said patent all lathes and other machine tools, except those employing single-point cutting tools for the turning of irregular or non-geometric forms out of metal.

[*Official Gazette March 25, 1930.*]